United States Patent
Sudou et al.

(10) Patent No.: US 7,509,747 B2
(45) Date of Patent: Mar. 31, 2009

(54) LASER LEVEL

(75) Inventors: Junichi Sudou, Ibaraki (JP); Takashi Nishimura, Ibaraki (JP); Takashi Odashima, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 9 days.

(21) Appl. No.: 11/635,568

(22) Filed: Dec. 8, 2006

(65) Prior Publication Data
US 2007/0155069 A1 Jul. 5, 2007

(30) Foreign Application Priority Data
Dec. 9, 2005 (JP) ............................ P2005-357038

(51) Int. Cl.
*G01C 5/00* (2006.01)
(52) U.S. Cl. ................ 33/290; 33/286; 33/DIG. 21
(58) Field of Classification Search ........... 33/290–291, 33/281–283, 285–286
See application file for complete search history.

(56) References Cited

U.S. PATENT DOCUMENTS

| 4,221,483 | A | | 9/1980 | Rando |
| 4,993,161 | A | * | 2/1991 | Borkovitz .................... 33/291 |
| 5,422,495 | A | * | 6/1995 | Cohn .......................... 250/573 |
| 2007/0130785 | A1 | * | 6/2007 | Bublitz et al. ................. 33/290 |

FOREIGN PATENT DOCUMENTS

| DE | 7812603 | 10/1978 |
| JP | 2004-309213 | 11/2004 |

* cited by examiner

*Primary Examiner*—Yaritza Guadalupe-McCall
(74) *Attorney, Agent, or Firm*—Mattingly, Stanger, Malur & Brundidge, P.C.

(57) ABSTRACT

A laser level includes: a covering; a stand on which the covering is mounted; a laser unit provided in a space surrounded by the covering and the stand; and a radiation window, provided in the covering, through which a laser beam emitted from the laser unit is radiated to an exterior of the covering. The laser level includes removal means which removes moisture in the space.

8 Claims, 5 Drawing Sheets

LASER LEVEL

CROSS-REFERENCE TO RELATED APPLICATIONS

This application is based on and claims the benefit of priority from the prior Japanese Patent Application No. 2005-357038, filed on Dec. 9, 2006; the entire contents of which are incorporated herein by reference.

BACKGROUND

1. Technical Field

The present invention relates to a laser level which, being used in a construction site and the like, radiates a laser beam as a reference line.

2. Description of Related Art

An example of a hitherto known laser level is shown in FIG. 10. A laser level 1 having a laser unit 5 rockably attached to an upper portion of a stand 2, a laser beam is radiated from a radiation window 4 to an exterior of a covering 3.

The radiation window 4 being covered with a light transmissive member such as glass or a thin film, the laser beam emitted from the laser unit 5 is transmitted through the light transmissive members, and radiated from the radiation window 4 to the exterior of the covering 3 (for example, refer to JP-A-2004-309213).

SUMMARY

In the event that the heretofore described laser level is used or left unused in rain or in a high-humidity environment, moisture may enter an interior of the laser level from a gap between the covering and the stand or the like. In the event that the moisture adheres to the radiation window, condenses into dew, and so on, there is a problem in that the laser beam emitted from the laser unit is distorted due to water droplets, and the distorted laser beam is radiated from the radiation window. Furthermore, there is also a problem of a breakdown caused by a short circuit or a corrosion of the laser unit inside the covering due to water accumulated inside.

In response to the problem, a totally waterproof structure of the laser level is considered, but it incurs an increase in manufacturing cost.

An object of the invention is to provide a laser level for which it is possible, by inexpensive and easy-to-use means, to prevent a distortion of a laser beam radiated from an radiation window, and to prevent a breakdown of a laser unit.

The object is achieved by providing removal means which removes water in a space surrounded by a covering and a stand of the laser level.

According to an aspect of the invention, as the removal means enables the removal even in the event that a liquid such as water enters an interior of the laser level, it is possible to prevent the distortion of the radiated laser beam, and the breakdown caused by the short circuit or corrosion of the laser unit.

According to another aspect of the invention, as the removal means is formed as a hole, it is possible to configure it easily.

According to another aspect of the invention, as the hole is made wider on an inner side than on an outer side, a fluid, such as water, dust and the like are restrained from entering from an exterior, enabling an increase in an efficiency of drainage of the fluid to the exterior of the laser level.

According to another aspect of the invention, as guide means is provided on the stand, it is possible to smoothly drain the water entering an interior of the laser level.

According to another aspect of the invention, as the interior of the laser level is hydrophobic, it is possible to easily carry out the drainage without the water or the like stagnating in the interior.

According to another aspect of the invention, as a part or a whole of the hole and a periphery of the hole is hydrophilic, it is possible to eliminate a problem in that a water film occurs in the hole due to a surface tension of a liquid such as water, preventing the liquid from being drained, thus enabling an increase in an effectiveness of the hole.

According to another aspect of the invention, even in the event that a fluid from below, such as a splash of rain drops from a ground, adheres, water droplets are repelled by a water repellent action, turned into large water droplets, and become likely to drip, enabling water or the like to be prevented from entering the interior of the laser level.

According to another aspect of the invention, as the hole is chamfered, it is possible to prevent a stagnation due to the surface tension or the like.

According to another aspect of the invention, as the water in the interior is sucked out in the event that a member such as a water absorbent sheet material is attached firmly to a discharge side of the hole, it is possible to promote a drainage more effectively, and it is also possible to obtain a dust prevention effect.

DESCRIPTION OF THE EMBODIMENTS

An embodiment of the invention will be described with reference to FIGS. 1 to 9. A description will be given hereafter with a covering side shown in FIG. 1 upward and a stand side downward.

Figure 1:
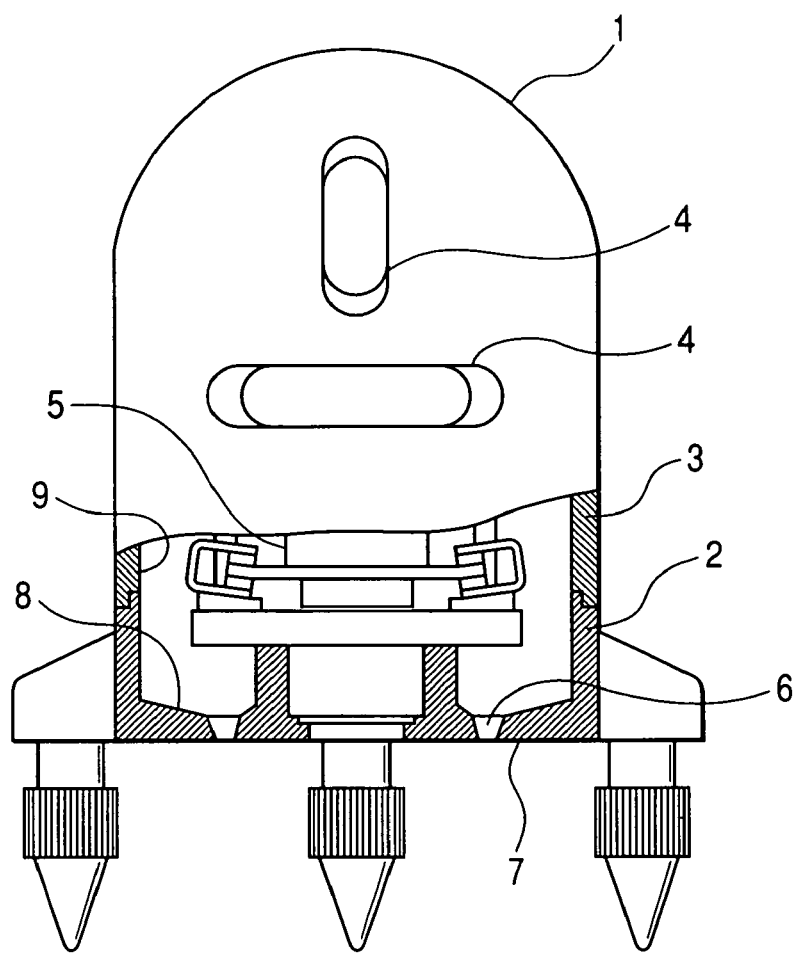
FIG. 1 is a front view showing a laser level of the invention.

As shown in FIG. 1, a laser level 1 is equipped with a stand 2, a covering 3, radiation windows 4 and a laser radiation unit 5. The laser radiation unit 5 includes a not-shown laser light source, a-not shown lens which converts a laser beam emitted from the laser light source into line light, and the like, and the line light emerging from the lens is radiated from the radiation windows 4 to an exterior of the laser level 1.

In FIG. 1, the laser radiation unit 5 is secured or rockably disposed in an upper portion of the stand 2 via a not-shown frame, and is covered with the covering 3. The covering 3 is provided with the radiation windows 4 through which the laser beam is transmitted and radiated to an outside of the covering 3.

A drain hole 6 which, being removal means of the invention, passes through from an inner bottom surface 8 to an outer bottom surface 7 is provided in the stand 2. Although the vertical direction in FIG. 1 of the drain hole 6 is most effective in a drainage of water or the like, it is possible to achieve an advantageous effect even in a case of assuming a horizontal direction as in FIG. 4 or an optional angle. A cross-sectional shape of the drain hole 6 is not limited to a circle, and an ellipse, a rectangle or the like is also acceptable.

Figure 2:
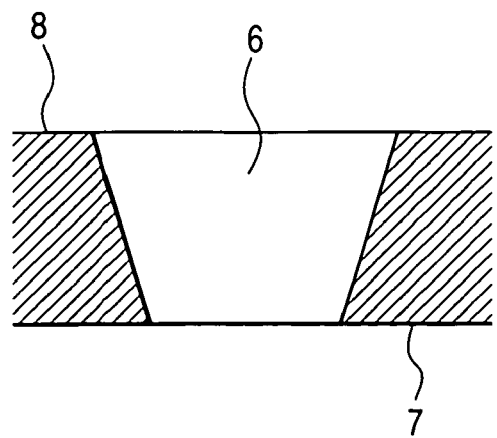
FIG. 2 is an enlarged sectional view of a drain hole 6 in FIG. 1.
Figure 3:
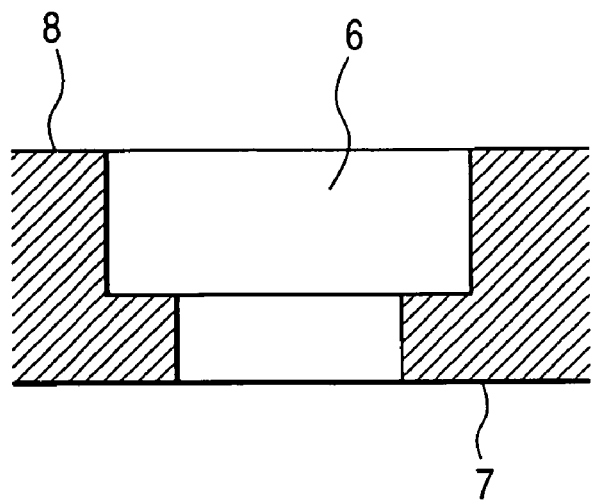
FIG. 3 is an enlarged sectional view of the drain hole 6 in FIG. 1.
Figure 4:
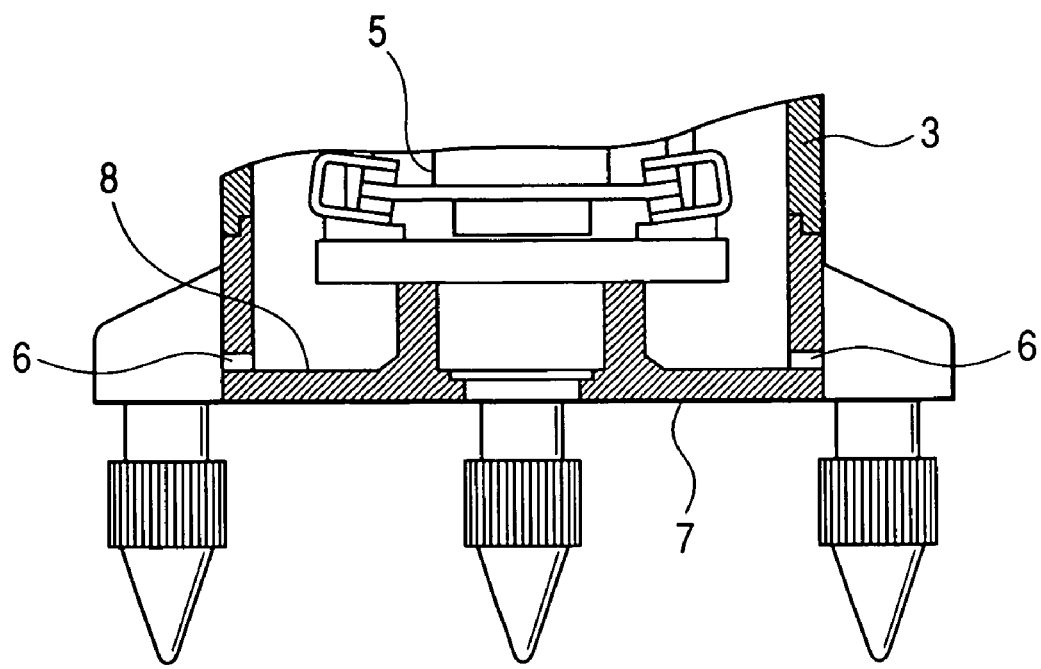
FIG. 4 is a sectional view showing another example of the drain hole 6 in FIG. 1.

As shown in FIGS. 2 and 3, by the drain hole 6 having a shape in which it is tapered or stepped to provide different opening areas in such a way that an opening area on the inner bottom surface 8 side is larger than that on the outer bottom surface 7 side, a fluid, such as water, dust and the like are restrained from entering from the exterior from the exterior of the laser level 1, enabling an increase in an efficiency of drainage of the fluid to the exterior of the laser level 1.

As shown in FIG. 1, the inner bottom surface 8 is shaped in such a way that an inclined surface is formed inclined toward the drain hole 6 configuring a guide of the invention, and an opening of the drain hole 6 is disposed in a lowest position of the inner bottom surface 8, there by guiding a flow of a liquid such as water to the opening of the drain hole 6.

Figure 5:
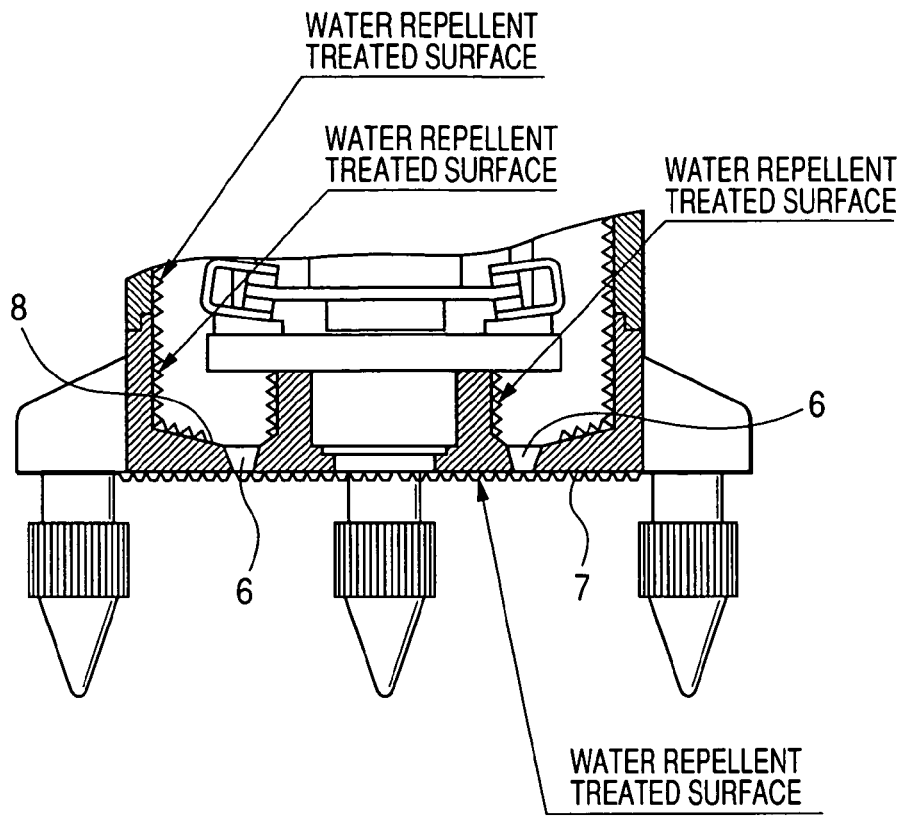
FIG. 5 is a partial sectional view in which the laser level in FIG. 1 is water repellent finished.

FIG. 5 is a view in which the stand inner bottom surface 8 of the stand 2 and a covering inner wall surface 9 of the covering 3 are water repellent finished. By coating the inner bottom surface 8 of the stand 2, the inner wall surface 9 of the covering 3, and the like in an interior of the laser level 1 with a hydrophobic water repellent of the invention, it is possible to prevent a liquid such as water entering the interior from adhering to and stagnating on the inner wall surface. Furthermore, by coating a vicinity of the drain hole 6 with a hydrophilic agent for hydrophilic treatment of the invention, it is possible to achieve an advantageous effect even in a case in which a flow channel is formed by a surface treatment in such a way that water droplets collected in the drain hole 6 is drained to an exterior of the laser level 1 through the drain hole 6.

When the outer bottom surface 7 of the stand 2 is water repellent treated using the hydrophobic water repellent of the invention or the like, in the event that a liquid such as water splashes back from below like a splash of rain drops, the liquid is immediately repelled and turned into large water droplets, thus making it difficult for the liquid to pass through the drain hole 6. As the laser level 1 is used by constantly vertically installing it on a reference surface such as a floor surface or on a tripod, its body will never be turned upside down, for which reason such a water repellent treatment will prevent the water droplets from entering the interior through the drain hole 6.

Figure 6:
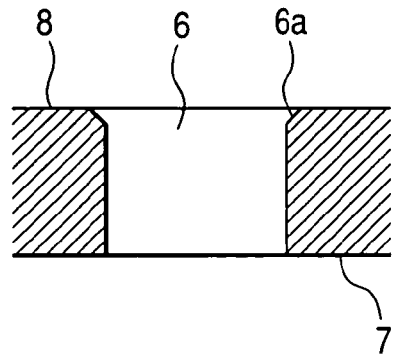
FIG. 6 is a sectional view showing an example in which the drain hole 6 is chamfered.
Figure 7:
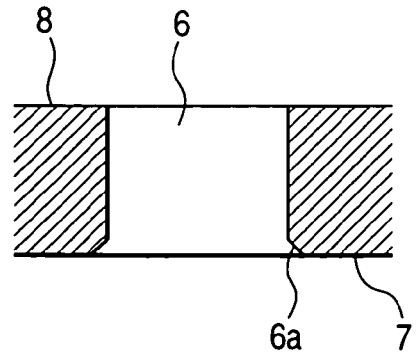
FIG. 7 is a sectional view showing an example in which the drain hole 6 is chamfered.
Figure 8:
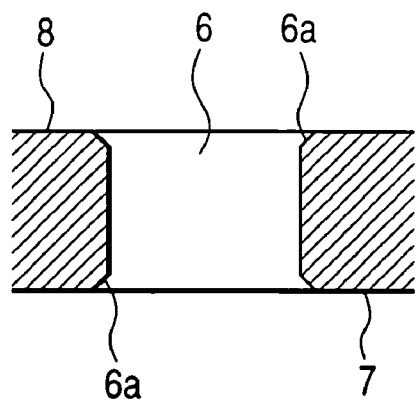
FIG. 8 is a sectional view showing an example in which the drain hole 6 is chamfered.

As shown in FIGS. 6 to 8, by providing a chamfer 6a on the opening of the drain hole 6, it becomes easy to introduce water droplets in the interior of the laser level 1 into the drain hole 6, while it becomes difficult for the opening of the drain hole 6 to form a water film which impedes a drainage due to a surface tension.

Figure 9:
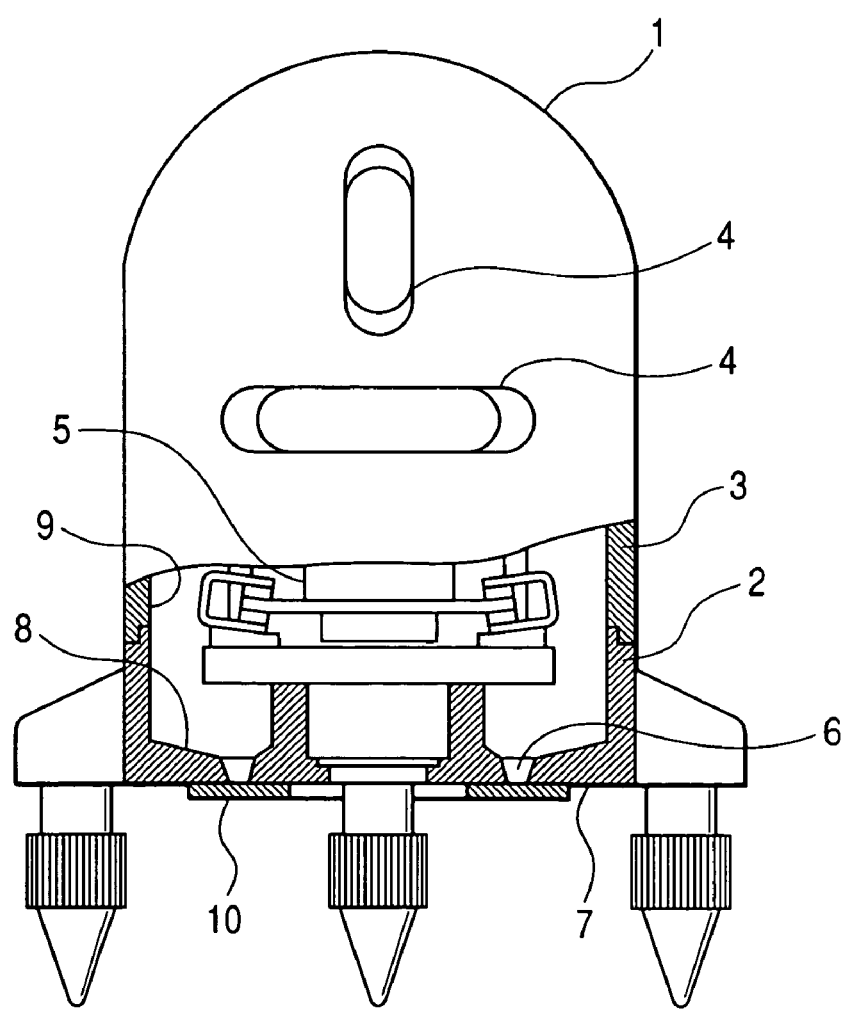
FIG. 9 is a view in which a water absorbent material is attached to the laser level in FIG. 1.
Figure 10:
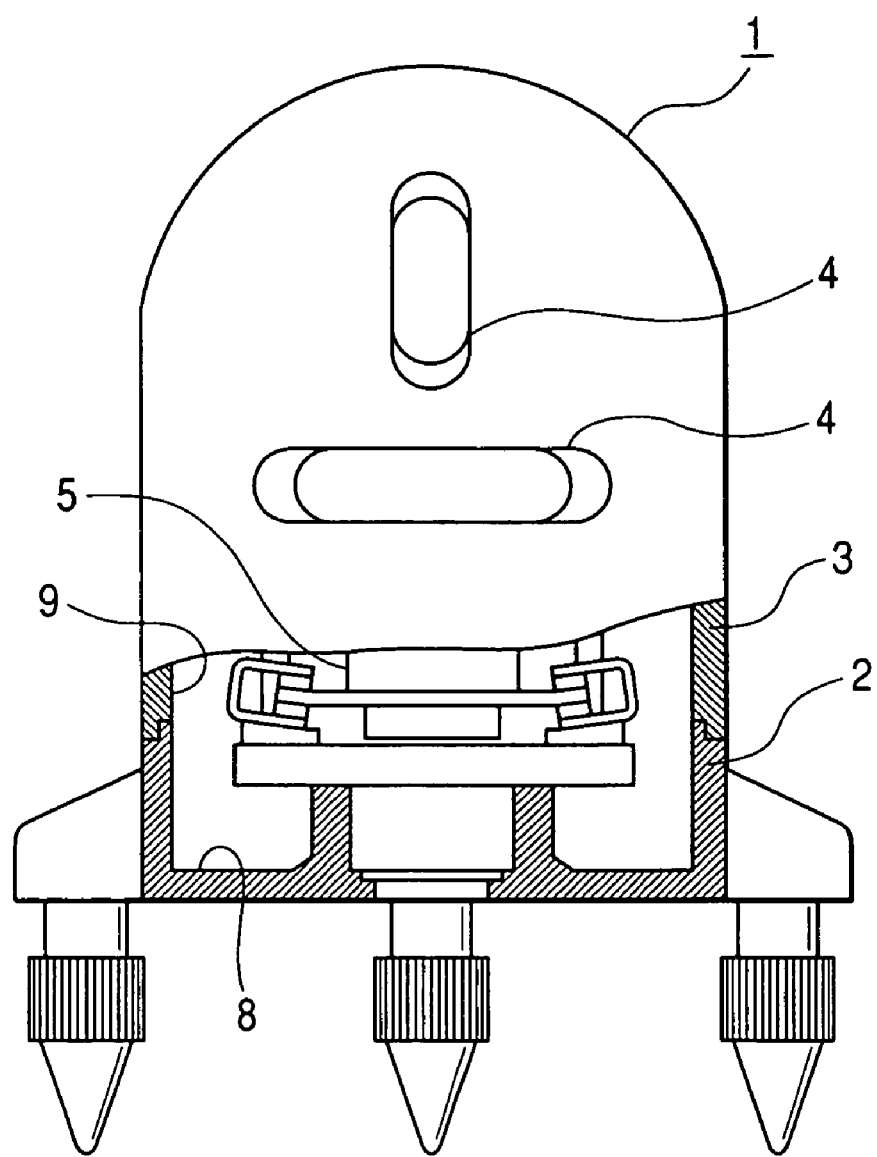
FIG. 10 is a front view showing a hitherto known laser level.

FIG. 9 showing an example in which a water absorbent material 10 is attached firmly to a discharge side opening of the drain hole 6, as water accumulated in the interior is sucked out into the water absorbent material 10, it is possible to effectively promote a drainage, and furthermore, it is also possible to provide a dust prevention effect.

What is claimed is:

1. A laser level comprising:
    a covering;
    a stand on which the covering is mounted;
    a laser unit provided in a space surrounded by the covering and the stand; and
    a radiation window, provided in the covering, through which a laser beam emitted from the laser unit is radiated to an exterior of the covering,
    wherein the laser level includes removal means which removes moisture in the space, and
    wherein the removal means is a hole which connects the space and an exterior of the laser level.

2. The laser level according to claim 1, wherein the hole has a larger opening area on an inner side than on an outer side.

3. The laser level according to claim 1, wherein guide means by which a liquid flows into the hole is provided on the stand.

4. The laser level according to claim 1, wherein a part or a whole of the stand and a part or a whole of covering inner surface of the covering is hydrophobic.

5. The laser level according to claim 1, wherein a part or a whole of the hole and a periphery of the hole is hydrophilic.

6. The laser level according to claim 1, wherein an outer bottom of the stand is hydrophobic.

7. The laser level according to claim 1, wherein a chamfer is provided at an edge of the hole.

8. The laser level according to claim 1, wherein the hole is covered with a water absorbent material.

* * * * *